(12) United States Patent
Fingerhut et al.

(10) Patent No.: US 7,039,577 B1
(45) Date of Patent: May 2, 2006

(54) NETWORK TRAFFIC ANALYZER

(75) Inventors: Howard W. Fingerhut, Mendham, NJ (US); Jeffrey D. Kashinsky, Morristown, NJ (US); Brian D. Kling, Branchburgh, NJ (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 978 days.

(21) Appl. No.: 09/739,815

(22) Filed: Dec. 20, 2000

Related U.S. Application Data

(63) Continuation-in-part of application No. 09/695,402, filed on Oct. 25, 2000.

(51) Int. Cl.
*G06F 9/44* (2006.01)
(52) U.S. Cl. .................. 703/21; 370/252; 370/392
(58) Field of Classification Search ............... 703/21; 370/252, 389, 392, 412; 709/223, 224; 713/201
See application file for complete search history.

(56) References Cited

U.S. PATENT DOCUMENTS 5,390,232 A    2/1995  Freeman et al.
5,499,237 A *  3/1996  Richetta et al. ............. 370/400
6,209,033 B1 * 3/2001  Datta et al. .................. 709/224
6,563,796 B1 * 5/2003  Saito .......................... 370/252
6,728,214 B1 * 4/2004  Hao et al. .................... 370/241

OTHER PUBLICATIONS

*Radio Access Protocol (RAP) for Mobitex*, Programmer's Guide, Aug. 20, 1999.

* cited by examiner

*Primary Examiner*—Albert W. Paladini
(74) *Attorney, Agent, or Firm*—Withers & Keys, LLC

(57) ABSTRACT

A system for and method of analyzing packet traffic in a packet-switched network, including collecting traffic logs from a network operations center, wherein the traffic logs are representative of packet traffic passing through an actual configuration of the network, and wherein each traffic log includes the time the traffic log was created and an associated packet's network entry and exit points. The collected traffic logs are stored in a computer such that the traffic logs can be replayed. A computer file is thereafter created and is representative of a modified network configuration that is different from the actual configuration of the network. The traffic logs are replayed in coordination with the modified network configuration to generate a histogram file representative of packet traffic passing through or via at least one of a host, node or link in the modified network configuration.

31 Claims, 12 Drawing Sheets

E:\
    host histograms\
        1999\
            11\
                11_31_1999\
                    101039.0.host
                    101039.1438.host
                    101304.0.host
                    ...
            12\
                12_01_1999\
                    101039.0.host
                    101039.1358.host
                    101039.1438.host
                    101304.0.host
                    ...
                12_02_1999\
                    101039.0.host
                    101039.1224.host
                    101039.1358.host
                    101304.0.host
                    ...
            ...
    2000\
        ...
        08\
            ...
            08_19_2000\
                101039.0.host
                101039.1224.host
                101039.1438.host
                ...
            08_20_2000\
                101039.0.host
                101039.1224.host
                101039.1358.host
                101304.0.host
                ...
            08_21_2000\
                101039.0.host
                101039.1224.host
                101304.0.host
                ...
            ...

Figure 4

D:\
    node histograms\
        1999\
            11\
                11_31_1999\
                    11001.node
                    1224.node
                    ...
            12\
                12_01_1999\
                    2.node
                    11001.node
                    1224.node
                    ...
                12_02_1999\
                    2.node
                    11001.node
                    1224.node
                    ...
                ...
        2000\
            ...
            08\
                ...
                08_19_2000\
                    2.node
                    11001.node
                    1224.node
                    ...
                08_20_2000\
                    2.node
                    11001.node
                    1224.node
                    ...
                ...

Figure 5

```
D:\
    traflog\
        1999\
            11\
                11_31_1999\
                    0.hour
                    1.hour
                    2.hour
                    3.hour
                    ...
                    22.hour
                    23.hour
            12\
                12_01_1999\
                    0.hour
                    1.hour
                    2.hour
                    3.hour
                    ...
                    22.hour
                    23.hour
                12_02_1999\
                    ...
        2000\
            ...
            08\
                ...
                08_19_2000\
                    0.hour
                    1.hour
                    ...
                    22.hour
                    23.hour
                08_20_2000\
                    0.hour
                    1.hour
                    ...
                    22.hour
                    23.hour
```

Figure 6

LOGICAL VIEW OF HOSTVIEW HISTOGRAM DATA

| Hour | Minute | OK | From Mailbox | In Mailbox | No xFer | Illegal | Congest | Error | Posack | Total |
|---|---|---|---|---|---|---|---|---|---|---|
| 0 | 0 | 0 | 0 | 0 | 0 | 0 | 0 | 0 | 0 | 0 |
| 0 | 5 | 1.6 | 0 | 0 | 0 | 0 | 0 | .4 | 2.4 | 4.4 |
| 0 | 10 | 13.2 | 0 | 0.6 | 0 | 0 | 1.4 | .4 | 99.8 | 115.4 |
| 0 | 15 | | | | | | | | | |
| .. | .. | | | | | | | | | |
| 1 | 0 | | | | | | | | | |
| 1 | 5 | | | | | | | | | |
| .. | .. | | | | | | | | | |
| .. | .. | | | | | | | | | |
| 23 | 0 | | | | | | | | | |
| 23 | 5 | | | | | | | | | |
| .. | .. | | | | | | | | | |
| 24 | 55 | | | | | | | | | |

Figure 7

NETWORK TRAFFIC ANALYZER

This application is a continuation-in-part application of U.S. Ser. No. 09/695,402, filed Oct. 25, 2000, entitled "Network Traffic Analyzer", which is incorporated herein by reference in its entirety.

BACKGROUND

1. Field of the Invention

The present invention is directed to managing and monitoring traffic and capacity in a packet-switched digital network. More particularly, the present invention is directed to capturing traffic log data, and graphically displaying network operation characteristics based on the traffic log data.

2. Background of the Invention

Mobitex is a digital wireless data network technology that was developed in 1984 and has since seen explosive growth. The Mobitex wireless network technology is recognized as an international data communication standard. It is a secure, reliable, two-way digital wireless packet switching network ideal for a variety of data communication applications, such as email and information broadcasting.

Presently there are 28 Mobitex networks operating in 22 countries throughout the world. FIG. 1 shows a typical Mobitex network 100 which has a pyramidal topology with a single Network Control Center (NCC) 10, a national exchange 15, several regional exchanges 20 (referred to herein as "MHXs"), several local exchanges 30 (referred to herein as "MOXs") and hundreds (or even thousands) of base stations 40 linked, or interconnected, to each other using high speed conventional or fiber optic or microwave communications links. ("MHX" and "MOX"are Swedish acronyms and are well known to those skilled in the art.) Wireless devices 50 communicate with a base station 40 with which it has the best available signal strength. Also, hosts 60a, 60b (e.g., a customer's computer, gateway, etc.) can be connected to Mobitex network 100 via, for example, the well-known X.25 communication protocol, using either dedicated leased circuits or public data networks.

To connect to Mobitex network 100, each radio modem in wireless device 50, or host 60 must have an active Mobitex Access Number (MAN). A MAN is assigned to every user (or device) subscribing (connected) to the Mobitex network. A MAN is analogous to a phone number on a telephone network. Thus, the MAN for a mobile user is stored in the mobile device's radio modem, just as a telephone number is stored inside a cellular phone.

Mobitex network 100 uses a packet-switching technique to transmit data. Each packet in the Mobitex network is called an MPAK (short for "Mobitex packet") and can have no more than 512 bytes of data. Messages longer than 512 bytes are divided into multiple packets. MPAKs include information about the origin, destination, size, type, and sequence of data to be sent, enabling packets to be transmitted individually, in any order, as traffic permits. Individual packets may travel along different routes, in any order, without interfering with other packets sent over the same frequency by different users. At the receiving end, all packets are accounted for, and reassembled into the original message. Further information about the technical aspects of a conventional Mobitex network can be found in Mobitex Interface Specification (MIS), Ericsson Mobile Data Design AB, Gothenburg, Sweden.

In order to provide network customers with reliable communications service, a network operator is often interested in learning whether capacity remains in the network and/or whether an overload condition has been reached. For this purpose, a conventional Mobitex network implements an alarm scheme to alert personnel at NCC 10 that a problem has been detected in the network. More specifically, each level of network 100 and the interconnecting links all have predetermined capacities. Existing Mobitex tools permit NCC personnel to set alarm condition thresholds with respect to, for example, MPAKs per hour or MPAKs per ten minute period, that travel through a particular network device. If a threshold is exceeded, the NCC receives an alarm that indicates, for example, that a particular base station 40 or MOX 30 exceeded the threshold. NCC 10 may subsequently receive an alarm indicating that the traffic level has fallen below the alarm threshold.

Each of these alarm events is, generally, displayed on a computer screen at NCC 10, one line per alarm. In a typical network of, for example, 2,000 base stations, 80 MOXs and six MHXs, alarms tend to scroll across the display screen without affording NCC personnel any true insight into the state of the network. Indeed, the amount of alarm information can be overwhelming.

To improve on the foregoing network alarm scheme, filters have been implemented to pick out alarms that represent specific information of interest, and display only those alarm events on a separate display screen, or store them in a separate file for later analysis. However, even with the implementation of filters, a network engineer may still have difficulty obtaining real-time or substantive analysis information for purposes of trouble-shooting or monitoring network operations. Indeed, alarm thresholds are often set artificially low and used primarily to indicate when capacity needs to be added. These alarms, therefore, tend to be even less meaningful. Thus, using existing alarm tools, it is apparent from the foregoing that a network engineer cannot "watch" what is happening in network 100. He can only know when a threshold has been hit.

One way to obtain a better view into network 100 is to periodically poll each of the devices in the network. Unfortunately, when this is done, additional traffic is created, thereby decreasing the amount of capacity that is available for customer use. Often such polling from the NCC has priority over customer traffic, thereby effectively ensuring that paying customers are undesirably blocked out of the network.

Further, from time to time, network engineers and operators contemplate network topology changes in view of customer complaints or growth opportunities. It would be highly desirable to have a network operations tool that can assist in analyzing "what-if" scenarios with respect to new nodes or links between nodes.

Accordingly, there is a need for network analysis tools that can provide real-time or near real-time graphical display of the operations of a network, and particularly a Mobitex network, without adding more traffic to the network itself. There is also a need for network operations tools that can help evaluate, in a meaningful way, proposed network topology changes.

SUMMARY OF THE INVENTION

The present invention provides a network engineer with true insight into a packet-switched network by exploiting traffic logs that are automatically generated and collected at a Network Control Center (NCC). One feature of a Mobitex network is that each time an MPAK exits the network, a traffic log is created. A traffic log contains the MPAK's entry point, the MPAK's exit point, the MANs of the sender and recipient, the MPAK's type (e.g., text, data, etc.) and its state (e.g., OK, illegal, error, etc). Other pieces of information include packet length, number of nodes, time of use, subscription type and network resources used. In a conventional Mobitex network, traffic logs (sometimes numbering in the millions per day) are passed up through network 100 and collected at NCC 10. Typically, traffic logs are used as the data source for customer billing. However, in the present invention, traffic logs are exploited to provide insight into the health of the network. Additionally, collected traffic logs are used as "real data" to analyze proposed network topology changes.

While the present invention is described with respect to a Mobitex network, those skilled in the art will appreciate that the invention is applicable to any packet-switched network in which traffic logs or similar information or data is collected at a central location or can be retrieved from distributed locations. Such networks include, for example GSM, CDPD, GPRS, Ardis and Reflex.

The present invention, a traffic analyzer (also referred to herein as "TRANAL" for TRaffic ANALyzer) is designed to provide a "window" into the operation of a packet-switched network (and in particular a Mobitex network) by gleaning information from traffic logs and graphically displaying the information in readily understandable ways. Prior to TRANAL, information concerning the state of the network was presented only in the form of alarms. However, alarms are only indicators of immediate problems within the network and therefore provide only limited information about conditions leading up to the problem. Accordingly, alarms are not always useful to predict potential trouble areas or to provide a real- or near-real time window into the network.

The present invention, on the other hand, provides a tool that can be used to monitor network conditions in near real-time. Overloads and congestion, for example, at a particular network node, or over a particular link, can be detected and corrected before they affect paying customers. In addition, the present invention can be used for network planning. Specifically, the charting or graphical display features of TRANAL facilitate trend analysis for each network node, as well as the entire network itself. Thus, high-traffic nodes and geographical areas can be more easily identified as areas where the network should be expanded.

In the preferred embodiment of the present invention, traffic logs generated by the network are analyzed and information that can be gleaned therefrom is presented or displayed to user in a graphical form. In Mobitex networks operating today, traffic logs are created throughout the network and are accumulated automatically at NCC 10. As discussed above, these traffic logs have been used primarily for billing. In accordance with the preferred embodiment of TRANAL, the traffic logs are captured as they arrive at the NCC. They are then processed and stored, and then are reprocessed as required into histogram data that can be viewed graphically as needed. For example, in the preferred embodiment, TRANAL displays a pair of histograms for a particular host. A first histogram or chart shows the MPAK traffic coming into the host over a predetermined period of time (e.g., 24 hours) and a second histogram or chart preferably shows the MPAK traffic leaving that host over the same period of time. Of course, one chart only may be displayed for a user, should that be desired. Also, the period of time over which the information is displayed can also be modified.

In addition to showing the traffic through a particular host, TRANAL preferably graphically shows traffic passing through any node (e.g., MOX, MHX) in the network. Specifically, Mobitex network 100 is a relatively well-defined network that seldom changes. That is, while base stations may be added, the addition of a MOX 30 (local switch) is relatively rare. It is even more rare that an MHX (regional switch) 20 is added. Accordingly, by looking only at entry and exit points of an MPAK (and/or its sender and recipient MANs) it is possible to determine the path that the MPAK takes through the network 100. By knowing the path, one can also thus determine which nodes (e.g., local switches, regional switch) the MPAK must have traveled through to reach its destination. Thus, TRANAL not only can graphically display host traffic flow, but it can also show traffic flow through any node of the network, as long as the network topology is known.

Similarly, in accordance with the preferred embodiment of the invention, the remaining capacity of, or alternatively, the traffic on, the links connecting the various nodes can also be graphically displayed. A component of each traffic log includes the number of data bytes that the MPAK is carrying. Accordingly, it is possible to determine how many bytes or bits of information travel over a particular path or link over a specific period of time.

Thus, at least three different "windows" into the network are preferably provided by the present invention: host view, node view and link view. And preferably, each can be called up by a user on demand. TRANAL preferably also provides a full network traffic view that displays the MPAK traffic in the entire network over, e.g., a 24-hour period.

The preferred embodiment of the present invention is preferably implemented as a client-server system, wherein the server(s) store(s) all relevant data and the client requests or queries for data regarding a particular host, node or link. The data relevant to that query is then preferably broadcast over a network and any client that had previously requested such a data set will also receive it at that time.

The present invention also provides a unique network planning analysis tool. The traffic logs are stored, in accordance with the present invention, such that they can be easily "played back" using different network topology "what-if" scenarios. For example, actual traffic logs from a previous day or from any desired period of time can be selected and replayed through an altered network topology to determine the impact on all or selected nodes and links.

It is therefore an object of the present invention to provide a method and system for analyzing a digital network using traffic log data.

It is yet another object of the present invention to provide a method and system for graphically displaying traffic in a digital network.

It is another object of the present invention to provide a method and system for obtaining, on-demand, a graphical display of network traffic.

It is also an object of the present invention to provide a method and system that preprocesses traffic log data so that information can be easily gleaned therefrom.

It is another object of the present invention to provide a method and system for monitoring and troubleshooting digital network problems.

It is still another object of the present invention to provide a method and system for providing capacity planning in a digital network.

It is another object of the present invention to provide a graphical display of network traffic through or on at least one of a host, a node or a link.

These and other objects of the present invention will become apparent upon a reading of the following detailed description in conjunction with the accompanying drawings.

BRIEF DESCRIPTION OF THE DRAWINGS

FIG. 4 shows an exemplary traffic log storage structure for a host traffic view in accordance with the preferred embodiment of the present invention.

FIG. 5 shows an exemplary traffic log storage structure for a node traffic view in accordance with the preferred embodiment of the present invention.

FIG. 6 shows an exemplary traffic log storage structure for an overall network traffic view in accordance with the preferred embodiment of the present invention.

FIG. 7 shows a logical structure for data to generate a histogram for a host view of traffic in accordance with the present invention.

DETAILED DESCRIPTION OF THE INVENTION

Figure 1:
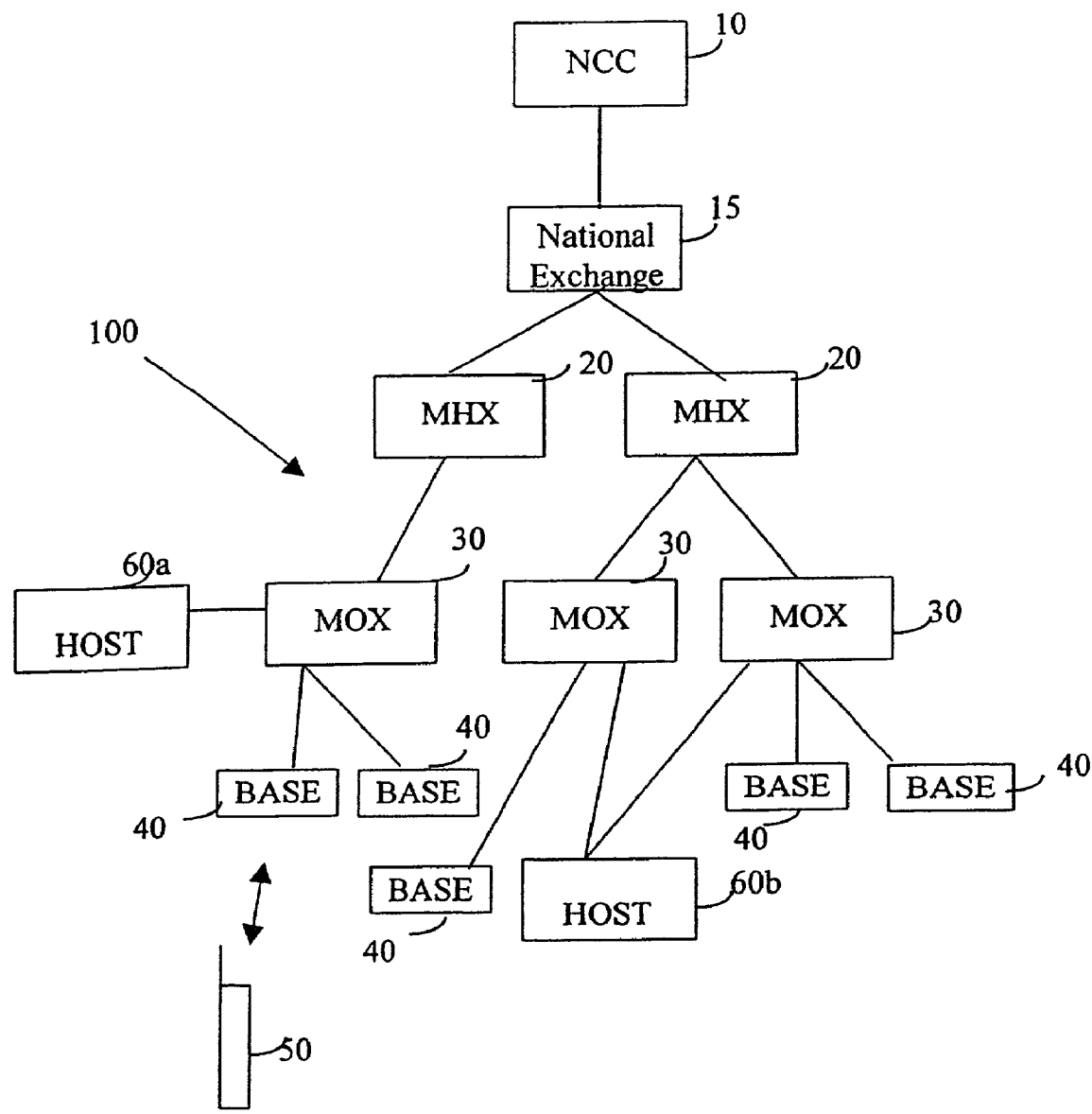
FIG. 1 is a schematic illustration of a Mobitex network.

The present invention, also referred to herein as "TRA-NAL," provides a network engineer or manager insight into a packet-switched network such as a Mobitex network 100 such as the network shown in FIG. 1. This insight is made possible through a unique use of traffic logs that are, in a network like a Mobitex network, automatically generated throughout network 100 and collected at a central location. More specifically, and in the case of a Mobitex network (although the principles of the present invention are applicable to any type of packet-switched network), a traffic log is automatically generated when an MPAK exits network 100. That is, when an MPAK is first received by a MOX 30 (from a host 60) or a base station 40 (from a wireless device 50), or when an MPAK is transmitted from a MOX 30 or base station 40 (to a host 60, wireless device 50), the MOX 30 or base station 40, whichever last transmitted the MPAK, automatically generates a traffic log. Then, depending on the traffic through the MOX or base station, the traffic log is either immediately sent to NCC 10 or is stored for a limited period of time (e.g., four hours) or until a buffer is filled with a predetermined number of logs (e.g., 25 logs). Ultimately, all traffic logs are collected at NCC 10 and, as a practical matter, most reach NCC 10 within 5–10 minutes of their creation due to the sheer number of traffic logs that are created in a typical network 100.

Figure 2:
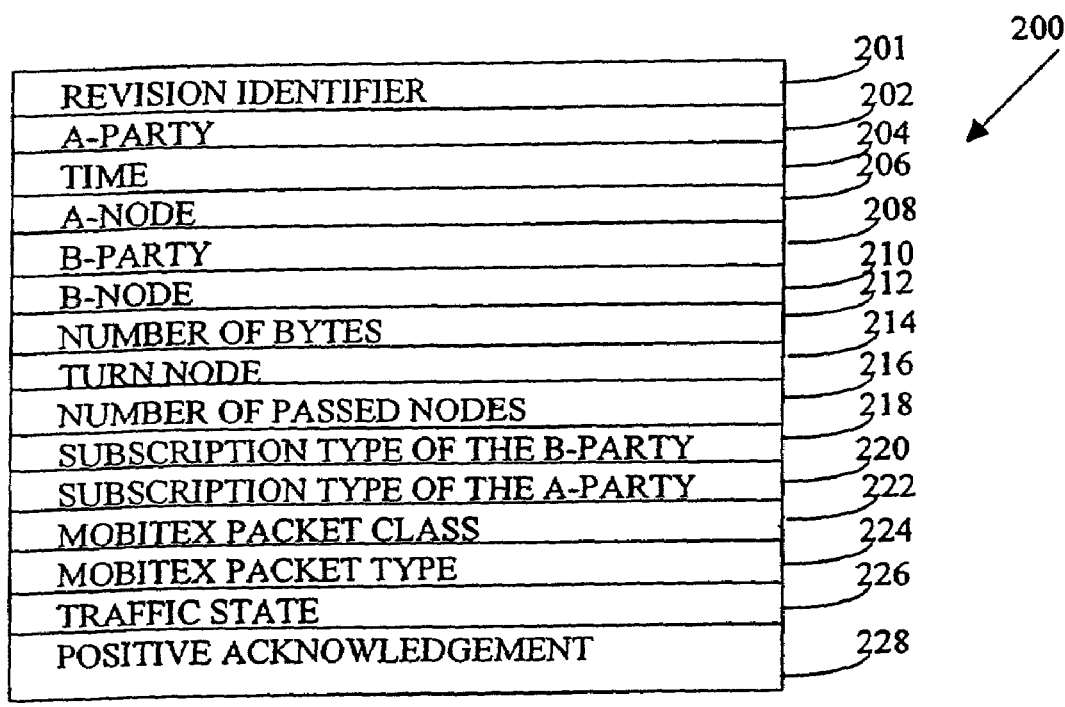
FIG. 2 shows the structure and components of a Mobitex traffic log.

The components of a traffic log are shown in FIG. 2. More detailed information about Mobitex traffic logs can be found in Ericsson Network Operator Library Document #15518-CRH 109002 Uen REV E, 1999-12-23, which is hereby incorporated by reference in its entirety. As shown in FIG. 2, a traffic log 200 typically includes a revision identifier 201 that identifies the revision of the signal, (e.g., format, of the traffic log), the A-party 202, which is typically the MAN of the sender, the time 204, which is the time the traffic log was created, the A-node 206, which is typically the node number of the node that first received the MPAK from the sender, the B-party 208, which is the MAN of the recipient, the B-node 210, which is the node number of the exit node associated with the recipient, the number of bytes 212, which is the number of bytes the MPAK contained, the turn node 214, which is the node number of the highest level node in the network through which the MPAK passed, the number of passed nodes 216, which is the number of nodes through which the MPAK has passed, the subscription type of the B-party and the A-party, 218, 220, the Mobitex packet class 222, the Mobitex packet type 224 (e.g., text, data, status, HPDATA (to identify data designated for a, e.g., a PALM VII or other non-standard device), the traffic state 226 (e.g. OK, from mailbox, in mailbox, no transfer, illegal, congest or error), and indication of positive acknowledgement 228.

Figure 3:
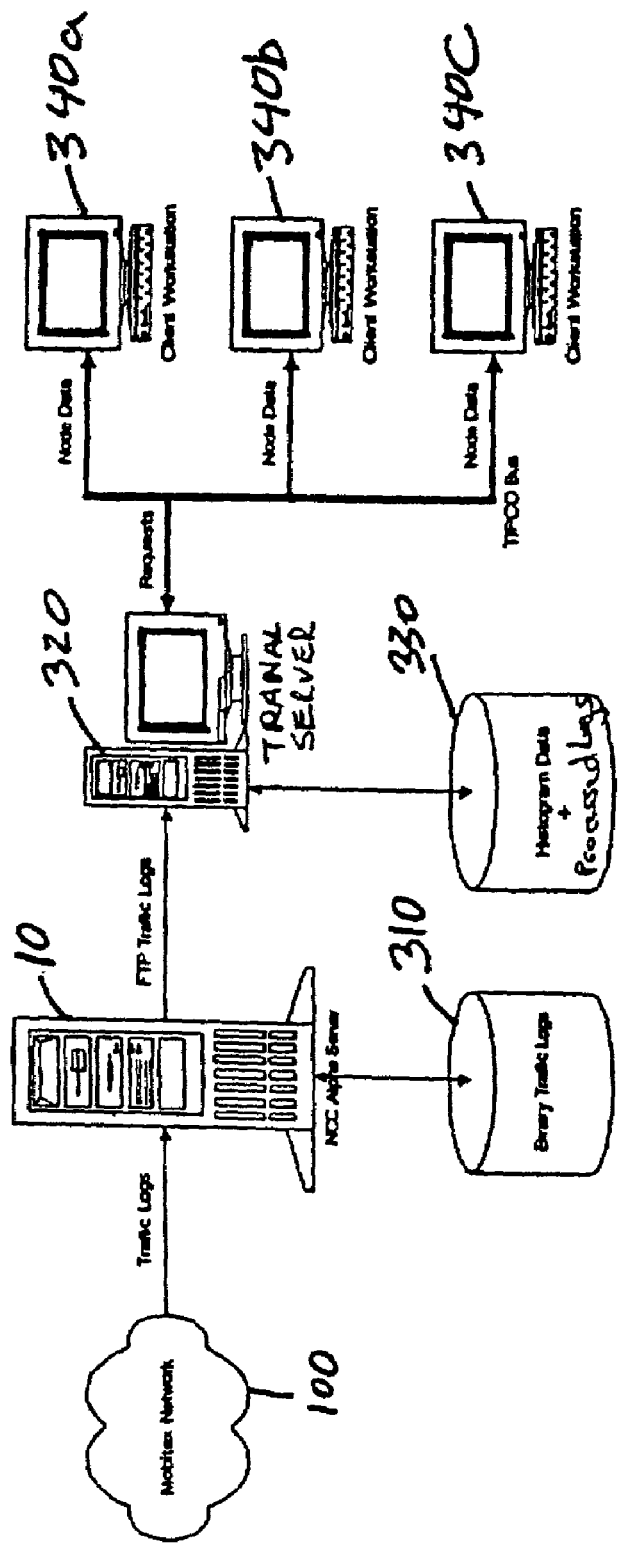
FIG. 3 is a schematic diagram of an implementation of the preferred embodiment of the present invention.

As illustrated in FIG. 3, traffic logs are generated in Mobitex network 100 by, e.g., base stations and MOXs within the network. For each MPAK that enters and exits network 100, one traffic log 200 is created. The logs are accumulated and passed to a computer server at NCC 10 in batches of, e.g., 25. Server 320 monitors the server at NCC 10 and detects when new logs have been stored in, e.g., database 310. Server 320 then employs FTP, or any other suitable data transfer scheme, to retrieve the new logs. These logs are then parsed by server 320 and saved into a new format that is more easily analyzed. More specifically, the parsed and formatted traffic logs are stored, in accordance with one aspect of the present invention, in flat files as histogram data 330.

Users, or clients 340a–c, preferably communicate with server 320 via a TIBCO bus available from TIBCO Software, Inc., Palo Alto, Calif. A TIBCO bus provides data broadcasting and addressing features that simplify the dissemination of the traffic information, typically a very large amount of data, to several users at the same time. For example, a user might want to view a histogram of the traffic at a particular host 60 for a given day. Thus, the user, via one of clients 340a–c, sends a request to server 320 for information about that host. Server 320 then broadcasts the requested host information for the current, or requested, day on the TIBCO bus. Whenever new information is obtained for that host (assuming the user requested information about the current day) the information is periodically re-broadcast and the clients are thus automatically updated. To reduce local network traffic, only those hosts specifically requested by clients are broadcast on the bus.

The following is a more detailed description of the preferred data storage and data structure implementations for TRANAL. Preferably, server 320 (FIG. 3) actually comprises a server pool of at least two computers, each with 1024 MB of RAM and two 36 GB SCSI hard drives. These two drives or disks are preferably divided into 3 partitions, giving the server pool access to 6 partitions in total, as shown in the table below.

As one skilled in the will recognize, the exact organization or disk volumes and servers, including quantities, names and sizes is not critical to the design and can be adapted to fit specific needs, requirements or circumstances.

| Computer | Memory | Partition 1 | Partition 2 | Partition 3 |
| --- | --- | --- | --- | --- |
| TRANAL1 | 1 GB | 8 GB | 36 GB (Data Store) | 28 GB (Traffic Logs) |
| TRANAL2 | 1 GB | 8 GB | 36 GB (Histograms) | 28 GB (Backup) |

TRANAL1 is primarily used to run a HostView Server (which broadcasts histogram data representative of MPAK traffic through hosts), organize log files, and perform administrative functions. TRANAL2 is primarily used to run a NodeView Server (which broadcasts histogram data representative of MPAK traffic through network nodes other than hosts).

The primary data source for TRANAL is a steady stream of binary traffic log files, which are delivered to TRANAL1, Partition 1 via File Transfer Protocol (FTP) (see FIG. 3). These logs are deposited in a directory called ncc_traflog and remain there for, e.g., 2 days. At the same time they are copied into longer-term storage on TRANAL2, Partition 3 (backup).

TRANAL1 preferably copies these logs into three locations:
  TRANAL1, Partition 3 (Traffic Logs) for use by the HostView server
  TRANAL2, Partition 2 (Histograms) for use by the NodeView server
  TRANAL1, Partition 2 (Data Store) for use by a Parse by Hour process Larger hard drives or an additional server can be added to the server pool to store histogram data for a LinkView server, which analyzes traffic and/or capacity in the links connecting each of the nodes in network 100. The HostView and NodeView servers create output files whose storage scheme is described below. The storage scheme for the LinkView output files is preferably similar to the NodeView storage scheme.

In the preferred embodiment of the present invention, TRANAL employs a flat-file storage structure, as opposed to a database (although as computing/processor speed increases and data storage access times decrease, it is contemplated that the use of databases may also be employed). TRANAL pre-processes data in ways that will make it easy to fulfill the most common requirements, rather than every conceivable requirement. Accordingly, when data is required, access is fast and efficient. In contrast, a database is more suited for requests whose nature is more difficult to predict, and therefore, the data is stored and retrieved in a more generic, but less efficient manner. Flat files are binary files or text files which use the operating system's file system structure as the primary means of organization. Because of the very large amount of data that is processed by TRANAL on a daily basis, the use of flat files is preferable to the use of presently available relational database management systems. In TRANAL, data is preferably pre-processed into files which are organized by date. Each day has it's own directory with the day's histogram information stored under it.

More specifically, server 320 reads in the binary traffic log files and simultaneously preferably processes them into daily histograms. These histograms are preferably stored in memory for 24 hours as they are being created. A histogram in accordance with the present invention preferably is representative of the number of MPAKs of the several states (as well as the total number of MPAKS) that pass through a given host (or node or link) over a predetermined period of time, e.g., 24 hours. The histogram preferably has a granularity (i.e., a timewise selectivity) of five minutes, though any desired granularity may be employed.

As the binary traffic logs are processed, they are preferably deleted from the disk (TRANAL1, Partition 3). In the preferred embodiment of the present invention, there is one pair of histograms for each host (customer) that uses network 100. Each pair of histograms represents traffic on that host for one day and is stored, preferably as a fixed length record, in one file on disk as 19 KB of binary data. The histograms are stored on TRANAL1, Partition 3 in a directory structure as follows:

host histograms\
    year\ (4-character form of the year the histogram was created)
        month\ (2-character form of the month the histogram was created)
            mm_dd_yyyy\ (date of the histogram)
                MAN.MOX.host (a file whose name includes the MAN number, connecting MOX, and ".host" file extension)

FIG. 4 shows an example of a directory structure for host view. Note that some of the files in FIG. 4 have the form xxxxx.0.host. The "0" MOX file is a file that is a histogram of MPAKs that traveled through a particular host from/to all of the MOXs that the host might be connected to. See in FIG. 1 where a host 60*b* is connected to more than one MOX.

The NodeView server (a second server like server 320, but not shown in FIG. 3) reads in the binary traffic log files and preferably processes them into daily histograms representative of node traffic. Like HostView histograms, NodeView histograms are preferably stored in memory for 24 hours as they are being created. To generate histograms for nodes, one can parse the traffic logs using the "turn node" and "number of passed nodes" components of the traffic log to determine the path of any one MPAK. Then, because a network like a Mobitex network is relatively static, it is possible to determine which nodes were used to carry any particular packet, or whether a particular node was used to carry a particular packet.

Alternatively, it is possible to identify in the traffic log the A-node and B-node or to identify the sender and recipient MANs which can indirectly identify the A-node and B-node. Then, knowing the A-node and B-node MANs, it is possible to "trace" the path of each of the MPAKs up through hierarchical network 100. Where the paths meet identifies an "apex" node or turn node. Again, because a network like a Mobitex network is relatively static, it is possible to determine whether any particular node is located along the path that has been recreated. Then, the histogram for each node along the path can be updated.

As the binary traffic logs are processed, they are deleted from the disk (TRANAL2, Partition 2). There is one pair of histograms for each node that makes up the Mobitex network. Each pair of histograms represents traffic on that node for one day and is stored in one file on disk as 19 KB of binary data. Several such files are stored on TRANAL2, Partition 2 in a directory structure similar to the HostView structure:

Histograms:\
    node histograms\
        year\ (4-character form of the year the histogram was created)
             month\ (2-character form of the month the histogram was created)
                mm_dd_yyyy\ (date of the histogram)
                      nodeid.node (a file whose name includes the node ID number and ".node" file extension)

FIG. 5 illustrates an exemplary directory structure for a NodeView.

In accordance with the present invention there is also a Parse_By_Hour process that sorts all of the binary traffic logs into new files organized by date and time. As shown in FIG. 2, each Mobitex traffic log 200 has a date stamp. The traffic logs, however, do not necessarily arrive at NCC 10 from the network in chronological order. The Parse_By_Hour process looks at each log's date stamp and copies the entire traffic log into a file set up for that day and hour. For each day there are preferably 24 files, one for each hour in the day. Of course, other segmentation schemes for the logs may be implemented as deemed suitable under the particular circumstances. As the binary traffic logs are processed, they are preferably deleted from the disk (TRANAL1, Partition 2). The "hourly" files are stored on TRANAL1, Partition 2, in a directory structure as follows and as shown in FIG. 6:

```
Data Store:\
    traflog\
        year\ (4-character form of the year the histogram was
                created)
            month\ (2-character form of the month the histogram
                    was created)
                mm_dd_yyyy\ (date of the histogram)
                    hh.hour (a file whose name includes the hour of
                            the day and ".hour" file extension)
```

In the preferred embodiment, sixty days of traffic logs are stored in this form. Typically, this much information will not fit on a single hard drive and thus the data is preferably split up over multiple disks, each with the same structure. The most recent files are preferably stored on the first disk and are moved to another disk as they become older. In this way, the Parse_By_Hour process need only point to one disk. When retrieving the stored hourly files later, it may be necessary to search across multiple disks in order to find the target date. Files more than sixty days old are preferably automatically compressed to save space and then are permanently archived onto compact discs.

FIG. 7 shows the logical view of data that is stored for a typical HostView histogram in accordance with the present invention. That is, each file of FIG. 4 can be viewed logically as the data structure of FIG. 7. Specifically, as traffic logs are received from NCC 10, the histogram for the current day's traffic logs is updated continuously. Thus, for a HostView file, each time a traffic log is received for a particular host, a count is incremented in the time "bin" that matches the time of the traffic log. As shown in FIG. 7, the time bins are preferably 5 five minutes long, thereby providing a granularity of 5 minutes in a given 24 hour period. Of course, the granularity can be increased or decreased depending on the intended use of the data. In addition to showing that an MPAK passed through a particular host at a particular time, the present invention also captures for the histogram the traffic state (see element 226 in FIG. 2) of the MPAK, which includes the possible states of: OK, from mailbox, in mailbox, no transfer, illegal, congested and error. The number of MPAKs that have been designated to have a positive acknowledgement (POSACK) is also preferably tracked. That is, in HostView, TRANAL preferably keeps track of the total number of MPAKs passing through a host, as well as the number of MPAKs of each of the several possible states and the number of MPAKs requiring positive acknowledgement.

Figure 8:
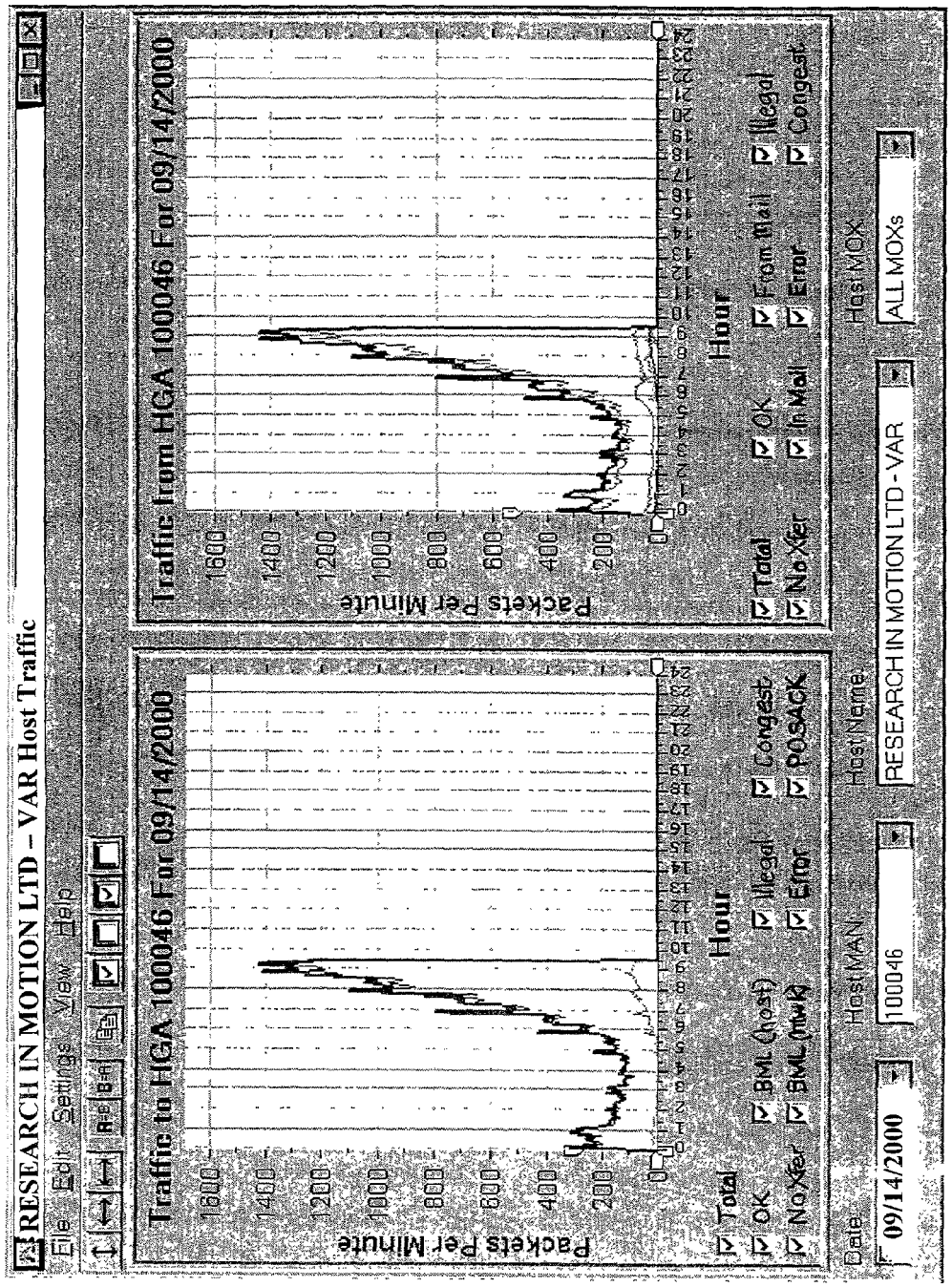
FIG. 8 is an exemplary pair of charts including histograms of traffic through a host, in accordance with the preferred embodiment of the present invention.

Thus, throughout the course of a day, each host file for that day is continuously updated so that by the end of a 24-hour period the whole day's traffic for all hosts is recorded in a form whereby a graphical histogram can be easily and quickly generated. FIG. 8 illustrates an exemplary display screen 800 including a pair of histograms in accordance with present invention. Charts 805 and 810 plot the number packets or MPAKs versus time, in this case a 24-hour period, of which only the first 9 hours have been plotted. Chart 805 represents traffic in the host that is being passed from the network to the host, and chart 810 represents traffic in the host that is being passed from the host to the network. Which way the traffic is passing can be gleaned from the traffic log itself by looking at, for example, the A-party and B-party components of the log.

Towards the bottom of exemplary display screen 800 are pull down menus for selecting the date and host for which histograms are desired. A host can be selected by host MAN or by host name. Also, as shown in FIG. 1, a host may be connected to more than one MOX. Thus, there is also preferably provided a pull down menu to select a histogram for all MOXs that the host is connected to. Still further, since the state of the MPAK is recorded as part of the traffic log parsing/histogram generating process, TRANAL preferably also gives the user the option of selecting a graph of any of the different types of possible states as well as a graph showing the total number of MPAKs regardless of MPAK state. A separate graph may also be plotted for the MPAKs that require positive acknowledgement. Methods for graphing a data set like that that shown in FIG. 7 are well-known to those skilled in the art.

Of course, those skilled in the art will appreciate that both charts 805 and 810 need not be displayed at the same time. For example, the charts could be displayed on different pages or one of the charts may not be displayed at all. Additionally, since the present invention has been described as providing 5-minute granularity, the present invention preferably also provides the ability "zoom in" at selected time periods so that the higher resolution can be seen on the display.

Similar charts can be generated for viewing traffic that pass through nodes using the NodeView histogram files, and for displaying traffic in the entire network.

A chart of the capacity or traffic of the links connecting the several nodes of network 100 may also be generated in accordance with the present invention. More specifically, since the present invention can analyze traffic logs and detect the traffic through any host or network node, it is also within the scope of the present invention to graphically display traffic or capacity on node links. Each traffic log contains the number of bytes that the MPAK contained. Since the traffic log also includes the time the log was created, it is possible to deduce, roughly, when the MPAK was transmitted over a certain link. Thus, one can then calculate the number of bytes or bits (per minute or second) that travel over the link over a period of time. In the context of the present invention, links not only include links between nodes, but may also include radio channel links and IP and X.25 links and Front End Processor (FEP) capacity. An FEP may be a programmable or non-programmable switch between the network and customer host and may or may not do protocol conversion or provide gateway services.

Figure 9:
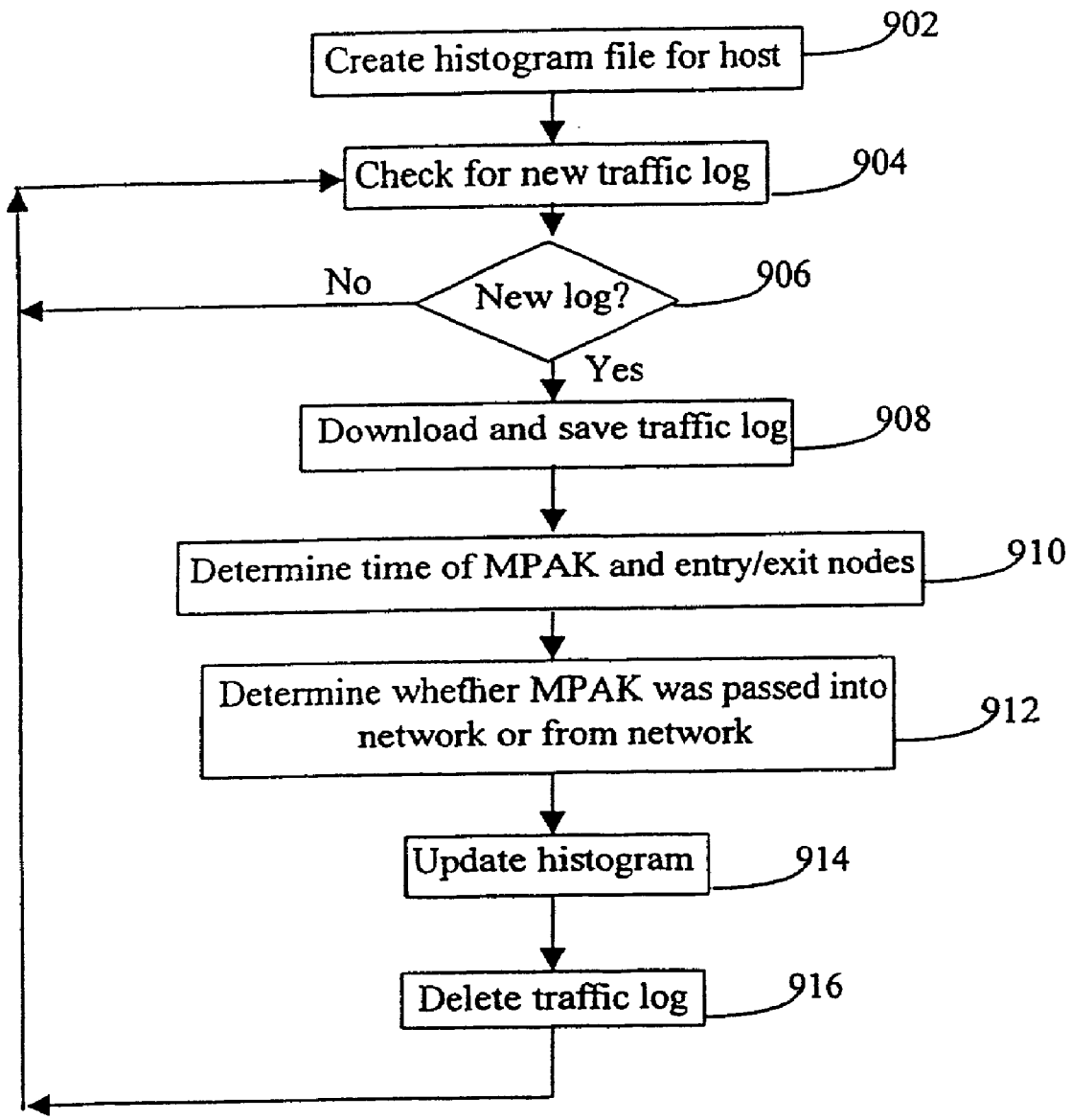
FIGS. 9–11 are flow diagrams illustrating preferred steps for practicing the present invention.

FIG. 9 illustrates exemplary steps for producing a HostView histogram in accordance with the present invention. Those skilled in the art will appreciate that the steps described are for generating a histogram for a single host, but that the these steps are applicable and scalable to generate histograms for all hosts in a network, such as Mobitex network 100. At step 902, a daily histogram file for a host is created. Then at step 904, NCC 10 is checked to determine if a new traffic log is available. If no new logs are available, step 906, the process returns to step 904. If a new log is available, the process continues with step 908, at which the new log is downloaded from NCC 10 and saved, at least temporarily. The traffic log is then, at step 910, analyzed or parsed to determine the time the MPAK passed through a host and the entry and exit nodes of the associated MPAK. At step 912 it is determined whether the MPAK, for a particular host, was being passed into the network or was being passed from the network. This information is necessary if the two charts 805 and 810 are to be generated. At step 914, the host histogram file is then updated by incrementing a "state" counter (which includes a positive acknowledgement counter) and a total counter for the appropriate time "bin" of the histogram. Logically, this is an update to an array such as the one shown in FIG. 7. Finally, at step 916, the traffic log itself is deleted, leaving only the histogram data as evidence of the traffic log. Thus, the histogram can be easily broadcast over a local network for, e.g., use by network operators/engineers, without having to generate a histogram from the raw traffic log data itself, thereby saving time and local network bandwidth.

Figure 10:
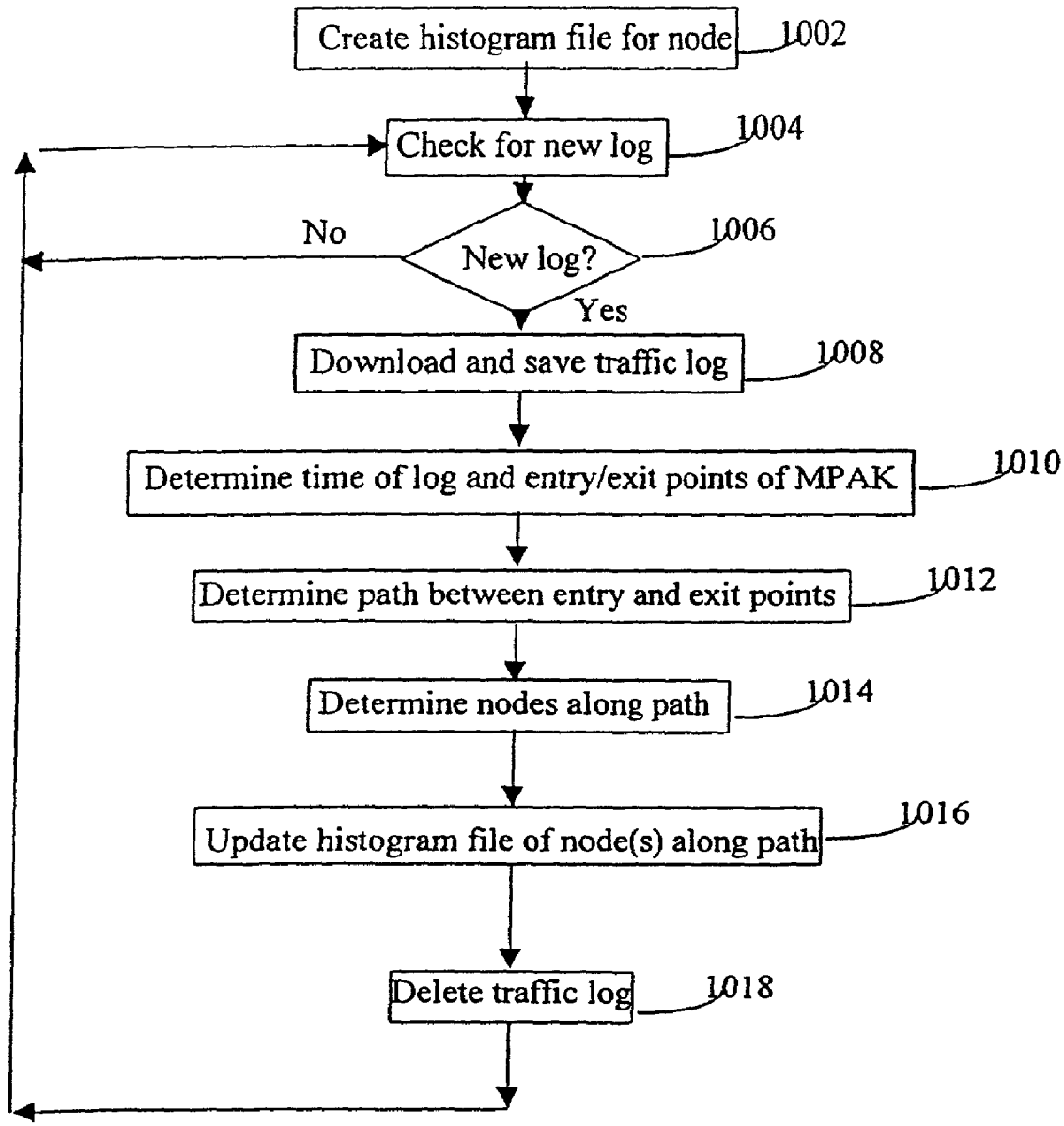

FIG. 10 shows a flowchart of exemplary steps for practicing the NodeView aspect of the present invention. At step 1002, empty histogram files for nodes are created. Then at step 1004, NCC 10 is checked to determine if a new traffic log is available. If no new logs are available, step 1006, the process returns to step 1004. If new logs are available, the process continues with step 1008, at which a new log is downloaded from NCC 10 and saved, at least temporarily. The traffic log is then, at step 1010, analyzed or parsed to determine the time the MPAK passed through its exit point and to detect the entry and exit points. At step 1012, the network path between the entry and exit points is determined, and at step 1014 the nodes along that path are determined. At step 1016, the histogram file of the nodes located along the path are updated. For Nodeview, charts analogous to charts 805, 810 are histogram charts of MPAKs travelling to higher levels of the network and MPAKs travelling to lower levels of the network. Finally, at step 1018, the traffic log itself is deleted, leaving only the histogram data as evidence of the traffic log. Thus, as in the case of HostView, the NodeView histogram can be easily broadcast over a local network for, e.g., network operators/ engineers, without having to generate a histogram from the raw traffic log data itself, thereby saving time and local network bandwidth.

Figure 11:
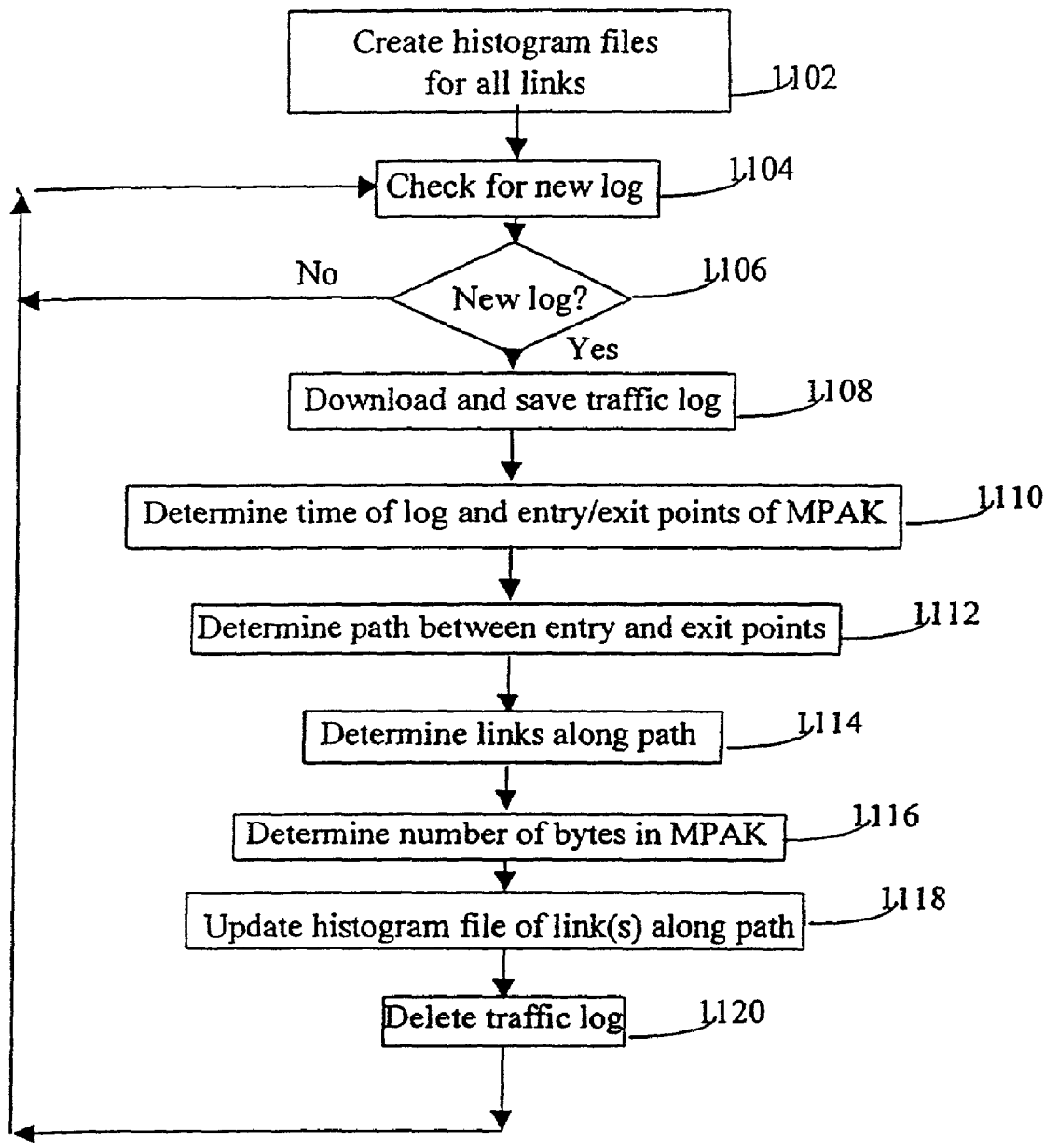

FIG. 11 is a flowchart of steps for practicing the LinkView aspect of the present invention. At step 1102, daily histogram files for the several links in network 100 are created. Then at step 1104, NCC 10 is checked to determine if a new traffic log is available. If no new logs are available, step 1106, the process returns to step 1104. If new logs are available, the process continues with step 1108, at which a new log is downloaded from NCC 10 and saved, at least temporarily. The traffic log is then, at step 1110, analyzed or parsed to determine the time the MPAK passed through its exit point and to detect the entry and exit points. At step 1112, the path between the entry and exit points is determined, and at step 1114 the links along that path are determined, based on the known topology of network 100. At step 1116, the number of bytes in the MPAK is determined. Then, at step 1118, the histogram files of the links along the path are updated based on the number of bytes travelling along the links. LinkView charts are analogous to charts 805, 810 in that the LinkView histograms plot traffic travelling to higher levels of the network and traffic travelling to lower levels of the network. Finally, at step 1120, the traffic log itself is deleted, leaving only the histogram data as evidence of the traffic log. Thus, as in the case of HostView and NodeView, the LinkView histogram can be easily broadcast over a local network.

The histograms generated by the present invention can be used by network operators to monitor and analyze network operation on a real or near real time basis. The HostView histograms may also be useful to personnel at companies or corporations (i.e., host operators) who may want to analyze the network use habits of their employees.

Significantly, the traffic logs collected and stored by the present invention are also a source of "real" data that can used in simulations that analyze network topology changes. For example, based on one or a series of NodeView histograms, it may be determined that a certain base station 40 is being overloaded. Accordingly, network operators may decide to reconfigure the network by adding a base station or somehow distributing the load in a different way. Before any such network changes are implemented, however, it is desirable to determine the actual impact of the proposed changes. The present invention provides a very accurate way of implementing analysis for this purpose.

Figure 12:
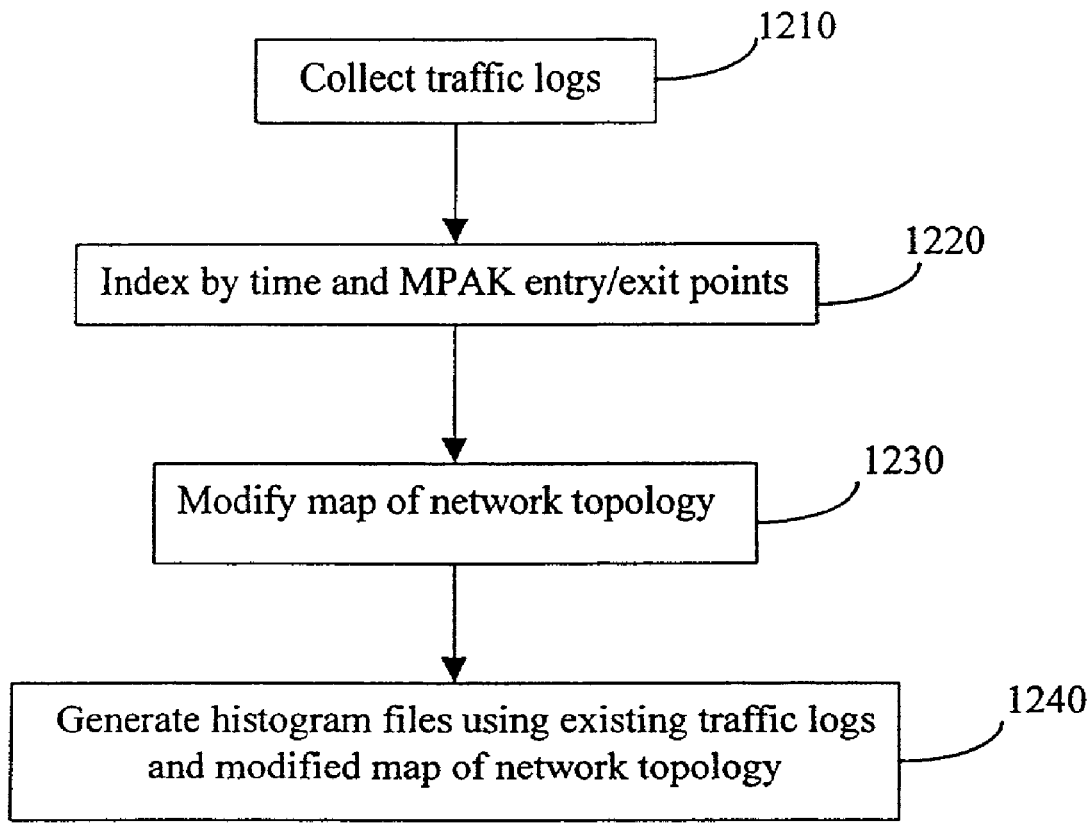
FIG. 12 is a flow diagram illustrating an exemplary process for using collected traffic logs to analyze proposed network topology changes.

Referring to FIG. 12, traffic logs are collected, at step 1210, by server 320 as previously described and preferably stored in the Parse by Hour configuration such as that shown in FIG. 6. At step 1220, the traffic logs are also preferably indexed by entry and exit nodes. Then at step 1230 the network topology map (which is used, for example, to determine MPAK transmission paths to determine nodes and links via which the MPAK traveled) is modified in accordance with the proposed network topology change. Then at step 1240 histogram files are generated using the stored traffic logs and the modified map of the network topology. That is, the stored traffic logs are "replayed" through the network to generate new histograms representative of the proposed network topology. In this way, network operators can easily see how the actual traffic from, e.g., the previous day, is handled by the proposed network topology.

The foregoing disclosure of the preferred embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method of resolving packet traffic congestion and overloaded nodes in a packet-switched network topology, comprising the steps of:
    (a) collecting a plurality of traffic logs from the network, the traffic logs being representative of traffic flowing in an existing network topology;
    (b) indexing the traffic logs by one or more criteria including at least the time of creation;
    (c) determining the existence of a packet traffic congestion condition and overloaded topology nodes by creating a first visual histogram of the traffic flow through at least one node in the existing network topology;
    (d) modifying a map of the existing network topology to create a proposed topology; and
    (e) generating a second visual histogram file by replaying the traffic logs through the proposed topology to verify the packet traffic congestion condition and overloaded network nodes have been resolved.

2. The method of claim 1, wherein the histogram file is a flat file, whereby direct and rapid access to stored data is effected.

3. The method of claim 1, wherein two histogram files are created, a first histogram being representative of traffic being passed into the network and a second histogram being representative of the traffic being passed from the network.

4. The method of claim 1, wherein the histogram file is representative of traffic being passed to a host connected to an entry or exit point.

5. The method of claim 1, further comprising analyzing the traffic logs to determine state information of packets associated with the traffic logs, and updating the histogram file with the state information.

6. The method of claim 1, wherein the histogram file plots packets per minute versus time.

7. The method of claim 1, further comprising broadcasting from a server computer data representative of the histogram file to a client computer.

8. The method of claim 1, wherein the network is a Mobitex network.

9. The method of claim 1, further comprising displaying a histogram based on data in the histogram file.

10. The method of claim 1, further comprising creating at least one histogram for each host of the network.

11. The method of claim 10, further comprising selecting for display the at least one histogram for a particular host.

12. A method of analyzing packet traffic in a packet-switched network, comprising the steps of:
    (a) collecting a plurality of traffic logs from a network operations center, the traffic logs being representative of packet traffic passing through an actual topology of the network, wherein each traffic log includes the time the traffic log was created and an associated packet's network entry and exit points for at least one of a host, a node and a link,
    (b) storing the traffic logs in a computer such that the traffic logs can be replayed;
    (c) generating a first histogram file representative of packet traffic passing through least one of said host, node and link in the existing network topology;
    (d) identifying the existence of packet traffic congestion and overloaded nodes;
    (e) creating a computer file representative of a proposed network topology that is different from the existing topology of the network;
    (f) replaying the traffic logs in coordination with the proposed network topology;
    (g) generating a second histogram file representative of packet traffic passing through at least one of a host, node and link in the proposed network topology; and
    (h) visually displaying the second histogram to determine that any packet traffic congestion and overloaded nodes identified in the first histogram have been resolved by the modified topology.

13. The method of claim 12, wherein the histogram file is a flat file.

14. The method of claim 12, wherein the network is a Mobitex network.

15. The method of claim 12, wherein the traffic logs represent traffic in the network over at least a 24 hour period.

16. The method of claim 12, wherein the histogram plots packets per minute versus time.

17. The method of claim 12, further comprising broadcasting, from a server computer, data representative of the histogram to a client computer.

18. The method of claim 12, further comprising displaying a histogram based on data in the histogram file.

19. The method of claim 12, further comprising creating at least one histogram for each node of the modified network.

20. The method of claim 12, further comprising selecting for display a histogram for a particular node.

21. A system for analyzing packet traffic in a packet-switched network, comprising:
    (a) means for collecting a plurality of traffic logs from a network operations center, the traffic logs being representative of packet traffic passing through an actual topology of the network, wherein each traffic log includes the time the traffic log was created and an associated packet's network entry and exit points;
    (b) a computer programmed to (i) store the traffic logs such that the traffic logs can be replayed, (ii) generate a first histogram file representative of packet traffic passing through at least one of a host, a node and a link in the actual network topology, (iii) identify the existence of potential traffic congestion due to an overloaded node (iv) create a computer file representative of a proposed network topology that is different from the actual topology of the network, (v) replay the traffic logs in coordination with the proposed network topology, and (vi) generate a second histogram file representative of packet traffic passing through at least one of a host, a node and a link in the proposed network topology.
    (c) a means to visually monitor for the existence of potential packet traffic congestion due to an overloaded node for at least one of said host, node and link contained in said first histogram file and said second histogram file.

22. The system of claim 21 wherein the histogram file is a flat file.

23. The system of claim 21, wherein the network is a Mobitex network.

24. The system of claim 21, wherein the traffic logs represent traffic in the network over at least a 24 hour period.

25. The system of claim 21, wherein the histogram plots packets per minute versus time.

26. The system of claim 21, further comprising means for broadcasting, from a server computer, data representative of the histogram to a client computer.

27. The system of claim 21, further comprising means for displaying a histogram based on data in the histogram file.

28. The system of claim 21, further comprising means for creating at least one histogram for each node of the modified network.

29. The system of claim 21, further comprising means for selecting for display a histogram for a particular node.

30. A computer readable medium containing instructions that when executed by a computer perform acts for resolving packet traffic congestion due to overloaded network nodes in a packet-switched network, the acts comprising:

collecting a plurality of traffic logs from the network, the traffic logs being representative of traffic flowing in the network;

indexing the traffic logs by one or more criteria including at least the time of creation;

determining the existence of a packet traffic congestion condition due to at least one overloaded node by creating a first visual histogram of the traffic through the at least one node in the existing network topology;

modifying a map of the topology of the network to create a proposed topology;

generating a histogram file by replaying the traffic logs through the proposed topology; and displaying a second histogram based on data in the histogram file to verify the packet traffic congestion condition due to the at least one node has been resolved.

31. A computer readable medium containing instructions that when executed by a computer perform acts for analyzing packet traffic in a packet-switched network, the acts comprising:

collecting a plurality of traffic logs from a network operations center, the traffic logs being representative of packet traffic passing through an actual topography of the network, wherein each traffic log includes the time the traffic log was created and an associated packet's network entry and exit points;

storing the traffic logs in a computer such that the traffic logs can be replayed;

generating a first histogram file representative of packet traffic passing through least one of said host, node and link in the existing network topology;

displaying a histogram visually based on data in the first histogram file to determine the presence of packet traffic congestion due to an overloaded node;

creating a computer file representative of a proposed network topology that is different from the actual topology of the network;

replaying the traffic logs in coordination with the proposed network topology;

generating a second histogram file representative of packet traffic passing through at least one of a host, a node and a link in the proposed network topology; and displaying a histogram visually based on data in the second histogram file to verify the packet traffic congestion due to an overloaded node has been resolved.

\* \* \* \* \*